US007472263B2

(12) United States Patent
Yokoi

(10) Patent No.: US 7,472,263 B2
(45) Date of Patent: Dec. 30, 2008

(54) METHOD AND APPARATUS FOR PREDICTION HANDLING MULTIPLE BRANCHES SIMULTANEOUSLY

(75) Inventor: Megumi Yokoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 88 days.

(21) Appl. No.: 10/841,433

(22) Filed: May 10, 2004

(65) Prior Publication Data

US 2005/0125646 A1  Jun. 9, 2005

(30) Foreign Application Priority Data

Dec. 5, 2003 (JP) ............................. 2003-407424

(51) Int. Cl.
*G06F 9/00* (2006.01)
(52) U.S. Cl. ..................................................... 712/239
(58) Field of Classification Search .......... 712/238–240
See application file for complete search history.

(56) References Cited

U.S. PATENT DOCUMENTS

| 5,434,985 | A | * | 7/1995 | Emma et al. ................. 712/240 |
| 5,758,143 | A | * | 5/1998 | Levitan ....................... 712/240 |
| 6,108,773 | A | * | 8/2000 | Col et al. ..................... 712/237 |
| 6,151,672 | A | | 11/2000 | Hunt |
| 6,353,882 | B1 | | 3/2002 | Hunt |
| 2004/0003218 | A1 | | 1/2004 | Ukai |

FOREIGN PATENT DOCUMENTS

| EP | 0 666 538 | | 8/1995 |
| JP | 7-262006 | | 10/1995 |
| JP | 10-228377 | A | 8/1998 |
| JP | 11-28677 | A | 10/1999 |
| JP | 2000-132391 | | 5/2000 |
| JP | 2000-132391 | A | 5/2000 |
| JP | 2004-38323 | A | 2/2004 |

OTHER PUBLICATIONS

Japanese Office Action mailed Jan. 23, 2007 and in correspondence to Japanese Patent Application No. 2003-407424.
Japanese Patent Office Action, mailed May 29, 2007 and issued in corresponding Japanese Patent Application No. 2003-407424.

* cited by examiner

*Primary Examiner*—Alford W. Kindred
*Assistant Examiner*—Benjamin Geib
(74) *Attorney, Agent, or Firm*—Staas & Halsey LLP

(57) ABSTRACT

A branch prediction apparatus includes a branch information receiving unit that receives simultaneously, branch information for each of a plurality of branch instructions that are completed simultaneously, and a parallel branch predicting unit that performs branch prediction in parallel for the branch instructions completed simultaneously, based on the branch information received and a branch history of the respective branch instructions, to obtain branch prediction results.

19 Claims, 8 Drawing Sheets

METHOD AND APPARATUS FOR PREDICTION HANDLING MULTIPLE BRANCHES SIMULTANEOUSLY

BACKGROUND OF THE INVENTION

1) Field of the Invention

The present invention relates to a technology for performing multiple predictions simultaneously.

2) Description of the Related Art

In the technology disclosed in Japanese Application Laid-Open No. 2004-038323, a global history for performing branch prediction based on a branch history of branch instructions requires that branch information used for registering the branch history be transmitted one after another.

FIG. 8 illustrates the conventional branch prediction apparatus that uses the global history. An instruction fetch section 20 issues an instruction fetch request using an instruction fetch address generated by an instruction fetch address generation section 10, and indexes the branch history 200. The branch history 200 stores, in correlated form, the address of the branch instruction and the address of a branch destination predicted, thereby indexing the address of the branch destination from the address of the branch instruction.

In other words, when a branch instruction corresponding to the instruction fetch address is registered in the branch history 200, the instruction fetch section 20 reads the instruction address of the branch destination predicted by the branch history 200, to perform the next instruction fetch.

Moreover, the branch instruction fetched is decoded by an instruction decoder 30, registered in a branch reservation station 40, and executed. When the branch instruction is executed, either of branch information, "Taken" or "Not Taken", is delivered to a global history 800.

The global history 800 stores the branch history of each branch instruction, and updates the branch history based on the branch information received. Then, the next branch direction of the branch instruction is predicted, based on the updated branch history, and a corresponding entry in the branch history 200 is updated based on the branch direction predicted.

Thus, in the branch prediction apparatus, the global history 800 predicts the branch direction using the branch history, and updates the branch history 200 based on the prediction. The branch history 200 predicts a branch destination based on the prediction result by the global history 800.

However, the conventional global history 800 requires that the branch information used for registering the branch history be transmitted one after another. Thus, only if all branch information is transmitted in a completely separate cycle, the branch information can be used and processed without damaging the information. However, if pieces of branch information are transmitted simultaneously, the global history 800 cannot process the information.

In super scalar processors and processors adopting the out-of-order execution method, instructions are executed depending on how conditions are satisfied and a plurality of instructions may be completed at the same time. Therefore, a plurality of branch instructions may be completed simultaneously. Thus, it is necessary that the global history be able to handle the branch instructions completed simultaneously.

Further, when the global history deals with pieces of branch information transmitted simultaneously, a plurality of updates of the branch history occurs simultaneously. Therefore, it is necessary that the branch history be able to process the simultaneous updates. However, usually the branch history is a random access memory (RAM), which has a limited number of input ports. Therefore, it is also necessary to limit the number of simultaneous updates, to match the number of input ports.

SUMMARY OF THE INVENTION

It is an object of the invention to at least solve the problems in the conventional technology.

A branch prediction apparatus according to an aspect of the present invention includes a branch information receiving unit that receives simultaneously, branch information for each of a plurality of branch instructions that are completed simultaneously; and a parallel branch predicting unit that performs branch prediction in parallel for the branch instructions completed simultaneously, based on the branch information received and a branch history of the respective branch instructions, to thereby obtain branch prediction results.

A branch prediction method according to another aspect of the present invention includes receiving simultaneously, branch information for each of a plurality of branch instructions that are completed simultaneously; and performing branch prediction in parallel for the branch instructions completed simultaneously, based on the branch information received and a branch history of the respective branch instructions, thereby obtaining branch prediction results.

The other objects, features, and advantages of the present invention are specifically set forth in or will become apparent from the following detailed description of the invention when read in conjunction with the accompanying drawings.

DETAILED DESCRIPTION

Exemplary embodiments of a method and an apparatus for branch prediction according to the present invention will be explained in detail, with reference to the accompanying drawings. An example in which two branch instructions are completed simultaneously will be mainly explained.

Figure 1:
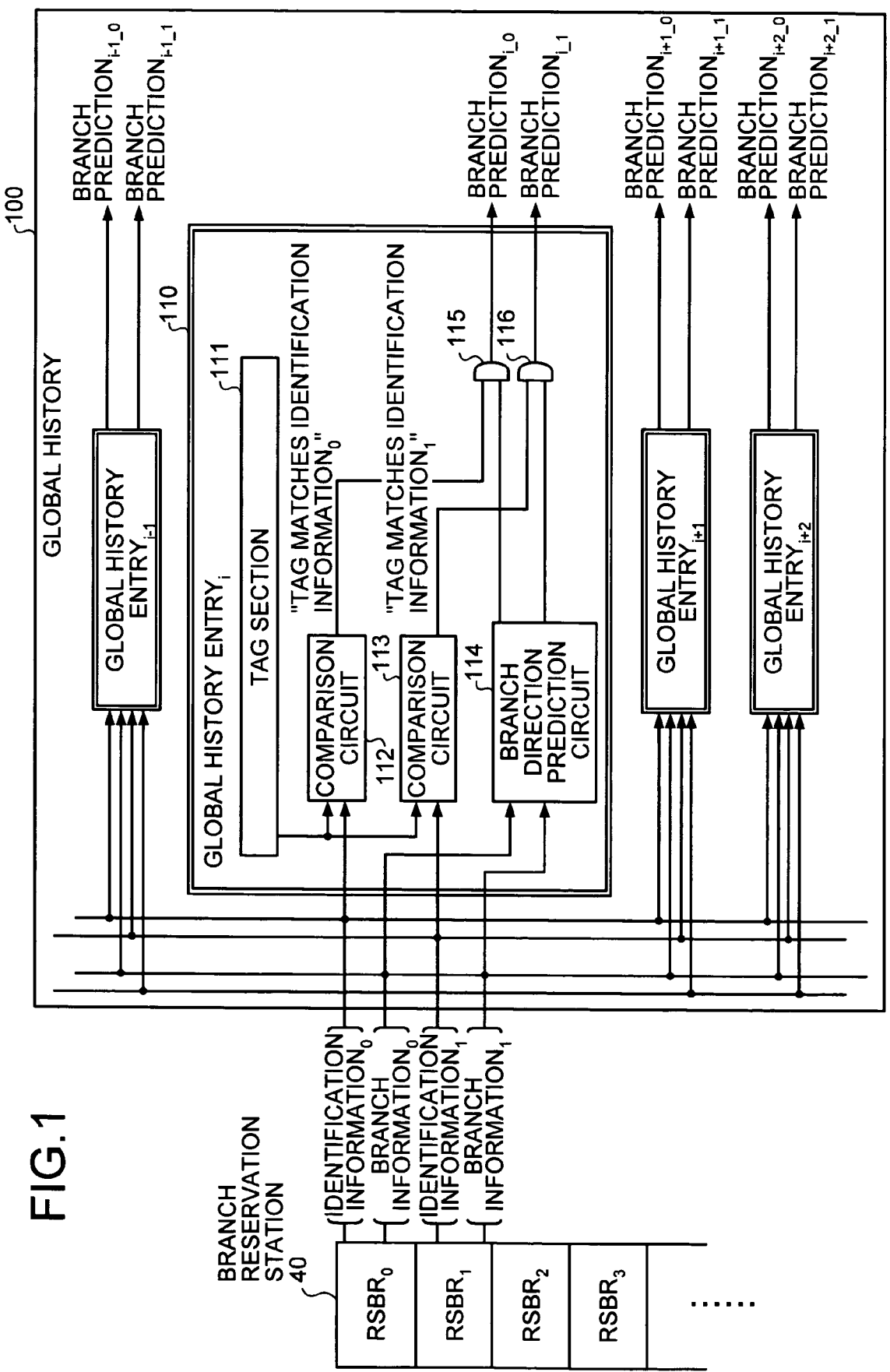
FIG. 1 is a functional block diagram of a global history entry in a global history according to an embodiment of the present invention.

FIG. 1 is a functional block diagram of a global history entry in a global history according to an embodiment of the present invention. The global history 100 includes a plurality of global history entries$_i$ (i=1, 2, . . . , n). The respective global history entries predict the branch direction of the corresponding branch instruction, and output the results of prediction as branch predictions.

A partial bit string in the branch instruction address associates a global history entry with a branch instruction. Therefore, a plurality of branch instructions in which a particular partial bit string of the instruction address is identical, are associated with the same global history entry.

Each global history entry has the same configuration, and therefore, a global history entry$_i$ 110 is explained in detail as an example. The global history entry$_i$ 110 has a tag section 111, comparison circuits 112 and 113, and a branch direction prediction circuit 114.

The tag section 111 stores, as a tag, the partial bit string of the address of the branch instruction whose branch direction is predicted by the global history entry$_i$ 110. In other words, when a new entry is created in the global history 100, a particular partial bit string of the address of the corresponding branch instruction is stored as a tag in the tag section 111. Alternatively, the entire address of the instruction or associative information using an instruction operation code as a key, may be used as the tag.

The comparison circuit 112 receives from RSBR$_0$, identification information$_0$ of a completed branch instruction, and compares the identification information with a tag stored in the tag section 111. The identification information$_0$ is a particular partial bit string of the address of the completed branch instruction, and RSBR$_0$ is an entry in a branch reservation station 40, The comparison circuit 113 receives from RSBR$_1$, identification information, of a completed branch instruction, and compares the information with a tag stored in the tag section 111. Here, RSBR$_1$ is an entry in the branch reservation station 40, In the branch reservation station 40, branch instructions are completed in order of RSBR$_0$, RSBR$_1$, RSBR$_2$, . . . , and uncompleted branch instructions are shifted toward RSBR$_0$ sequentially. Therefore, since at the most two branch instructions are completed simultaneously, the identification information and branch information are handed over from RSBR$_0$ and RSBR$_1$ to each global history entry.

A branch direction prediction circuit 114 predicts the branch direction for each branch instruction, using branch information$_0$ received from RSBR$_0$, branch information, received from RSBR$_1$, and the branch history information stored therein.

For example, the branch direction prediction circuit 114 stores a number T of branches continuously "Taken" in the past, and a number N of branches continuously "Not Taken". When the number of branches continuously "Taken" becomes equal to T, the branch direction prediction circuit 114 predicts that the next is "Not Taken", and when the number of branches continuously "Not Taken" becomes equal to N, the branch direction prediction circuit 114 predicts that the next is "Taken".

An AND circuit 115 in the global history entry$_i$ 110 calculates AND of the branch prediction result corresponding to the branch information$_0$ and a comparison result from the comparison circuit 112, to generate a branch prediction$_{i\_0}$. That is, when the identification information$_0$ received from the RSBR$_0$ matches the tag stored in the tag section 111, the branch direction prediction circuit 114 uses the branch history information and the branch information$_0$ received from the RSBR$_0$, to predict the branch direction. Thereafter, the AND circuit 115 generates a branch prediction$_{i\_0}$.

Similarly, an AND circuit 116 in the global history entry$_i$ 110 calculates AND of the branch prediction result corresponding to the branch information, and a comparison result from the comparison circuit 113, to generate a branch prediction$_{i\_1}$. That is, when the identification information, received from the RSBR$_1$ matches the tag stored in the tag section 111, the branch direction prediction circuit 114 uses the branch history information and the branch information$_1$ received from the RSBR$_1$, to predict the branch direction. Thereafter, the AND circuit 116 generates a branch prediction$_{i\_1}$.

The global history 100 merges the respective branch prediction$_{i\_0}$ and the branch prediction$_{i\_1}$ of all global history entries, into a branch prediction$_0$ and a branch prediction$_1$.

Figure 2:
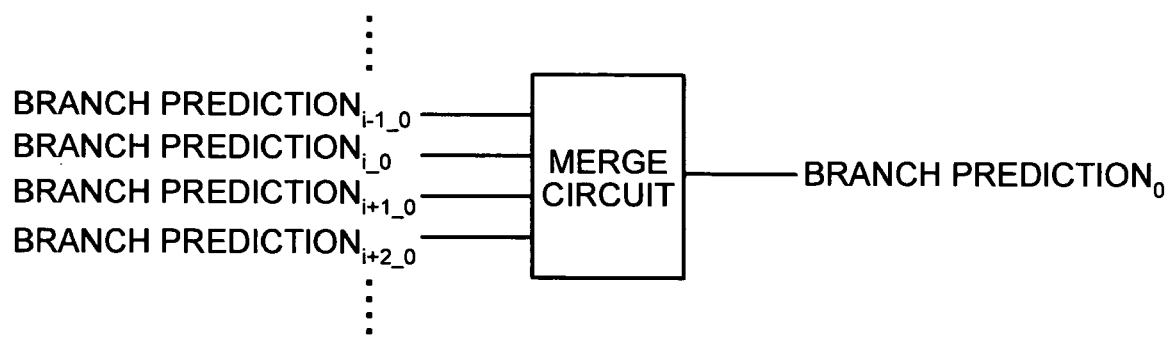
FIG. 2 illustrates one example of a merge circuit that merges branch predictions of the respective global history entries.

FIG. 2 illustrates one example of a merge circuit that merges the respective branch predictions of the respective global history entries. The merge circuit merges branch prediction$_{i\_0}$ (i=1, 2, . . . , n) of the respective global history entries, into a branch prediction$_0$.

Here, when a new entry is created in the global history 100, it is a prerequisite that the completed branch instruction does not hit on the existing entry. This assures that only one of the branch predictions$_{i\_0}$ (i=1, 2 . . . , n) is generated. Therefore, the simplest configuration of the merge circuit would be to calculate OR of the branch predictions$_{i\_0}$ (i=1, 2, . . . , n).

Similarly, by calculating OR of the branch predictions$_{i\_1}$ (i=1, 2, . . . , n), a branch prediction$_1$ can be generated. Thus, by respectively merging the branch predictions$_{i\_0}$ and the branch predictions$_{i\_1}$, at the most two branch-predictions, that is, the branch prediction$_0$ and the branch prediction, can be obtained. In other words, if the identification information$_0$ and the identification information, match the tag in separate global history entries, both the branch prediction$_0$ and the branch prediction$_1$ can be obtained.

All global history entries receive identification information and branch information from RSBR$_0$ and RSBR$_1$ simultaneously, and generate a branch prediction when either of the identification information received matches the tag stored in the tag section 111. Therefore, the global history 100 can process the branch information of the branch instructions that are completed simultaneously in RSBR$_0$ and RSBR$_1$.

If two branch instructions hit on the same global history entry (multiple hit), and if the two branch instructions are identical, the branch direction prediction circuit 114 uses both the pieces of branch information to perform the branch prediction. If it is assumed herein that the branch reservation station 40 adopts in-order method of execution, when identical branch instructions are completed simultaneously, the first branch instruction has high possibility of being "Taken". Assuming that the first branch instruction is "Taken", the multiple hit can be processed efficiently.

On the other hand, since the tag stored in the tag section 111 is a partial bit string of the address of the branch instruction, if two branch instructions hit on the same global history entry, though the two branch instructions are not identical, the branch direction prediction circuit 114 uses the branch information$_1$ to perform the branch prediction. Alternatively, either one of the branch instructions may be selected based on the number of multiple hits or a probability of prediction success.

Figure 3:
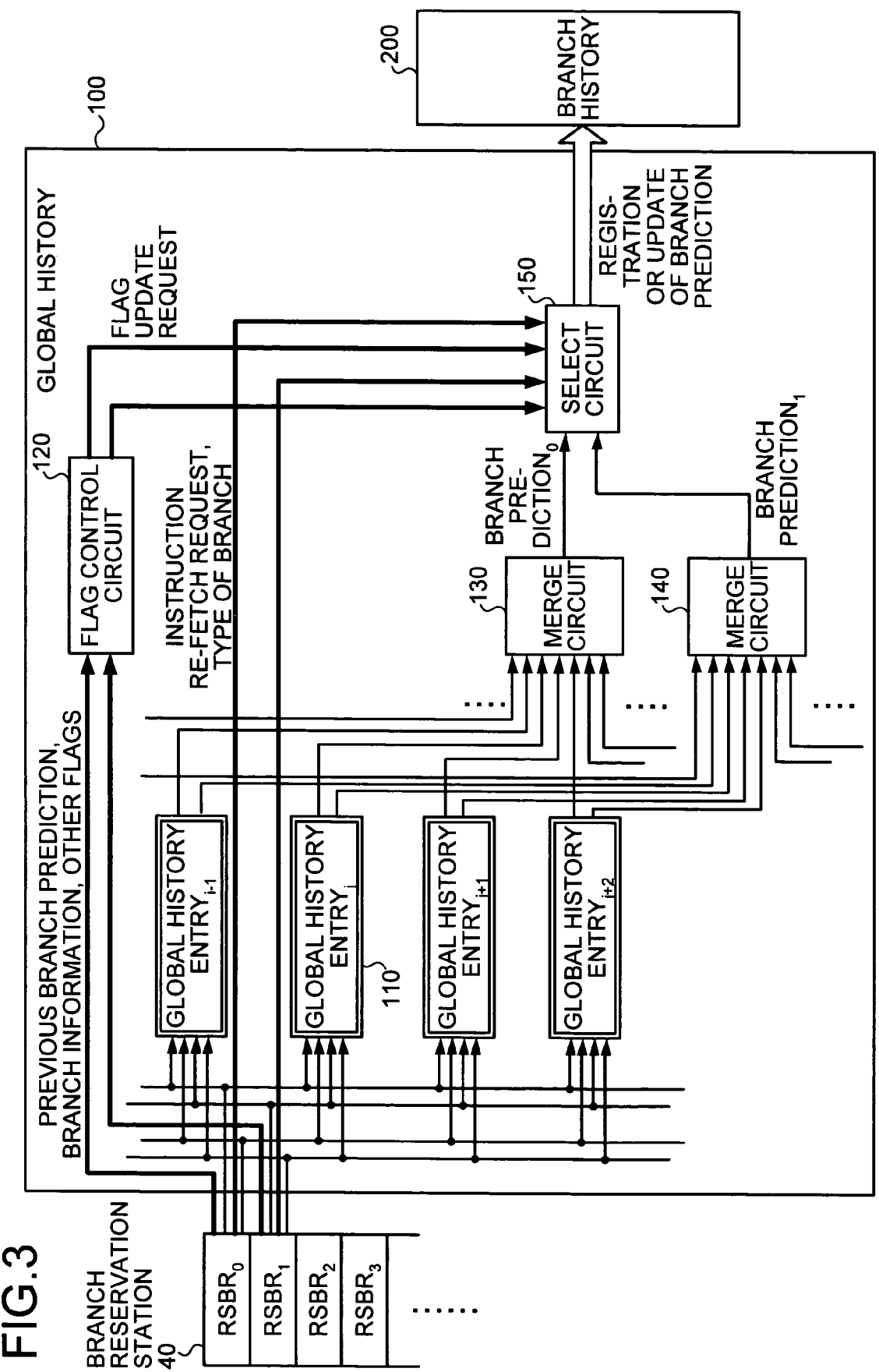
FIG. 3 is a functional block diagram of the global history.

The configuration of the global history 100 according to the embodiment will be explained below. FIG. 3 is a functional block diagram of the global history 100. The global history 100 has a flag control circuit 120, merge circuits 130 and 140, and a select circuit 150, in addition to n global history entries$_i$ (i=1, 2, . . . , n).

The flag control circuit 120 receives the previous branch predictions and branch information from the RSBR$_0$ and RSBR$_1$, and controls a Dizzy flag and a Giddy flag for each branch instruction.

The Dizzy flag is set if no branch occurs even though the branch history 200 predicted a branch. The Giddy flag is set if the branch destination is wrong, even though a branch occurs as predicted by the branch history 200. These flags are registered in the branch history 200 for each branch instruction, and are reset if the branch prediction is successful.

The flag control circuit 120 generates a signal for setting or resetting the Dizzy flag and the Giddy flag, based on the prediction by the branch history 200 and the actual branching that took place. The select circuit 150 uses the signal generated.

Figure 4:
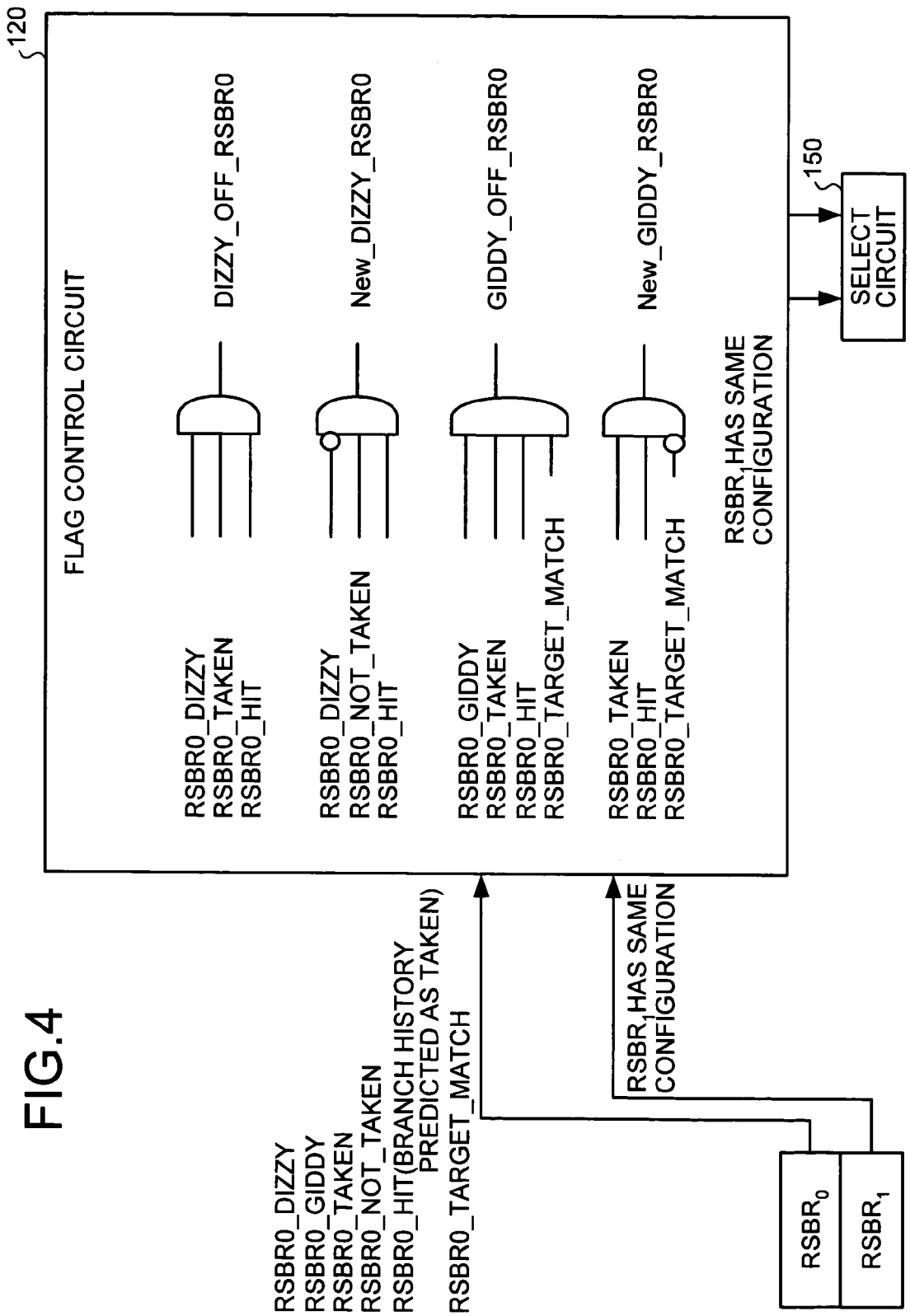
FIG. 4 illustrates one example of a flag control circuit.

FIG. 4 illustrates one example of the flag control circuit 120. The same circuit configuration is used for controlling the flag for the branch instruction from $RSBR_0$, and for controlling the flag for the branch instruction from $RSBR_1$. Therefore, an example for controlling the flag for the branch instruction from $RSBR_0$ will be explained.

As shown in this figure, the flag control circuit 120 receives RSBR0_DIZZY, RSBR0_GIDDY, RSBR0_TAKEN, RSBR0_NOT_TAKEN, RSBR0_HIT, and RSBR0_TARGET_MATCH from $RSBR_0$.

Here, RSBR0_DIZZY indicates the current state of the Dizzy flag for the branch instruction from $RSBR_0$, and RSBR0_GIDDY indicates the current state of the Giddy flag for the branch instruction from $RSBR_0$. RSBR0_TAKEN indicates that the branch instruction from $RSBR_0$ is "Taken", and RSBR0_NOT_TAKEN indicates that the branch instruction from $RSBR_0$ is "Not Taken". RSBR0_HIT indicates that the branch history 200 has predicted "Taken" for the branch instruction from RSBR0, and RSBR0_TARGET_MATCH indicates that the branch destination of the branch instruction from $RSBR_0$ is accurately predicted.

The flag control circuit 120 calculates AND of RSBR0_DIZZY, RSBR0_TAKEN, and RSBR0_HIT, and generates DIZZY_OFF_RSBR0. Here, the DIZZY_OFF_RSBR0 signal resets the Dizzy flag for the branch instruction from $RSBR_0$.

In other words, the flag control circuit 120 sets the current Dizzy flag, and if the prediction by the branch history 200 is a success, the flag control circuit 120 generates a signal to reset the Dizzy flag.

The flag control circuit 120 calculates AND of negation of RSBR0_DIZZY, RSBR0_NOT_TAKEN and RSBR0_HIT, and generates New_DIZZY_RSBR0. Here, the New_DIZZY_RSBR0 signal sets the Dizzy flag for a branch instruction from $RSBR_0$.

In other words, the flag control circuit 120 resets the current Dizzy flag, and if the prediction by the branch history 200 is a failure, the flag control circuit 120 generates a signal to set the Dizzy flag.

The flag control circuit 120 calculates AND of RSBR0_GIDDY, RSBR0_TAKEN, RSBR0_HIT, and RSBR0_TARGET_MATCH, and generates GIDDY_OFF_RSBR0. Here, the GIDDY_OFF_RSBR0 signal resets the Giddy flag for a branch instruction from $RSBR_0$.

In other words, the flag control circuit 120 sets the current Giddy flag, and if the branch history 200 accurately predicts the branch destination, the flag control circuit 120 generates a signal to reset the Giddy flag.

The flag control circuit 120 calculates AND of RSBR0_TAKEN, RSBR0_HIT, and negation of RSBR0_TARGET_MATCH, and generates New_GIDDY_RSBR0. Here, the New_GIDDY_RSBR0 signal sets the Giddy flag for a branch instruction from $RSBR_0$.

In other words, if the branch history 200 predicted a branch and the branch occurred, but the branch destination was wrong, the flag control circuit 120 generates a signal to set the Giddy flag.

Thus, the flag control circuit 120 generates DIZZY_OFF_RSBR0, New_DIZZY_RSBR0, GIDDY_OFF_RSBR0, and New_GIDDY_RSBR0, and the select circuit 150 uses the signals generated.

The merge circuit 130 (see FIG. 3) merges the branch prediction$_{i\_0}$ (i=1, 2, ..., n) in the respective global history entries, into a branch predictions$_0$. The merge circuit 140 merges the branch prediction$_{i\_1}$ (i=1, 2, ..., n) in the respective global history entries, into a branch prediction$_1$.

The branch history 200 has only one input port, and therefore, it is necessary to refine the two branch predictions generated simultaneously. Therefore, of the branch prediction$_0$ and the branch prediction$_1$ that are generated simultaneously, the select circuit 150 selects one of the branch predictions to be used for updating the branch history 200.

Specifically, the select circuit 150 selects a branch-instruction to be updated based on the following priority levels:
(1) a branch instruction to be re-fetched (the previous prediction was wrong);
(2) a branch instruction for which a different branch prediction mechanism is used;
(3) a branch instruction for which the global history 100 has predicted a change in the branch direction; and
(4) a branch instruction, for which a change of state (values of the Dizzy flag and the Giddy flag) other than the branch direction, is predicted.

The reason why (1) is given highest priority is as follows. On completion of a certain branch instruction, a request for instruction re-fetch indicates that the prediction of the branch history 200 was wrong. If a relevant entry did not exist in the branch history 200, a new entry is registered. However, if a relevant entry exists in the branch history 200, but the prediction written therein was wrong, the branch instruction is preferentially selected to correct the prediction value (priority level 1).

When a certain branch instruction causes an instruction re-fetch, the branch instructions in the RSBR entries following that branch instruction are not executed, and hence are discarded. Therefore, there is only one "branch instruction to be re-fetched", which is to be completed simultaneously.

The reason why (2) is given second-highest priority is as follows. In the branch prediction apparatus according to this embodiment, a different branch prediction mechanism is provided to deal with unconditional branch instructions such as subroutine call and return. The branch prediction apparatus performs maintenance of the branch prediction mechanism based on the information selected by the select circuit 150. Therefore, when a signal indicating the type of branch indicates the unconditional branch instruction such as subroutine call and return, the branch instruction is preferentially selected (priority level 2) as an object to be updated.

Subroutine call and return are unconditional branch instructions, therefore, unlike conditional instructions, evaluation of a condition is not necessary. Thus, by registering these instructions in the branch history 200, the prediction of at least the branch direction succeeds. Hence, the success rate of prediction of such instructions is exceptionally high. Moreover, these instructions are always "Taken", and therefore, very little maintenance of the branch history 200 is required. Therefore, if a separate path for maintenance of the branch prediction mechanism is provided regardless of registering and updating the branch history 200, it is not necessary to give a very high priority level to the update of the branch history 200 in the case of (2).

The priority level of (3) is third-highest because when the global history 100 predicts a change in the branch direction, it is necessary to reflect this change in the branch history 200 (priority level 3).

The priority level of (4) is lowest because when change of the state of the flag is predicted, it is necessary to reflect this change in the branch history 200 (priority level 4).

If a branch instruction cannot be selected even if the priority levels of (1) to (4) are used, the select circuit 150 selects the branch instruction from $RSBR_1$.

Figure 5:
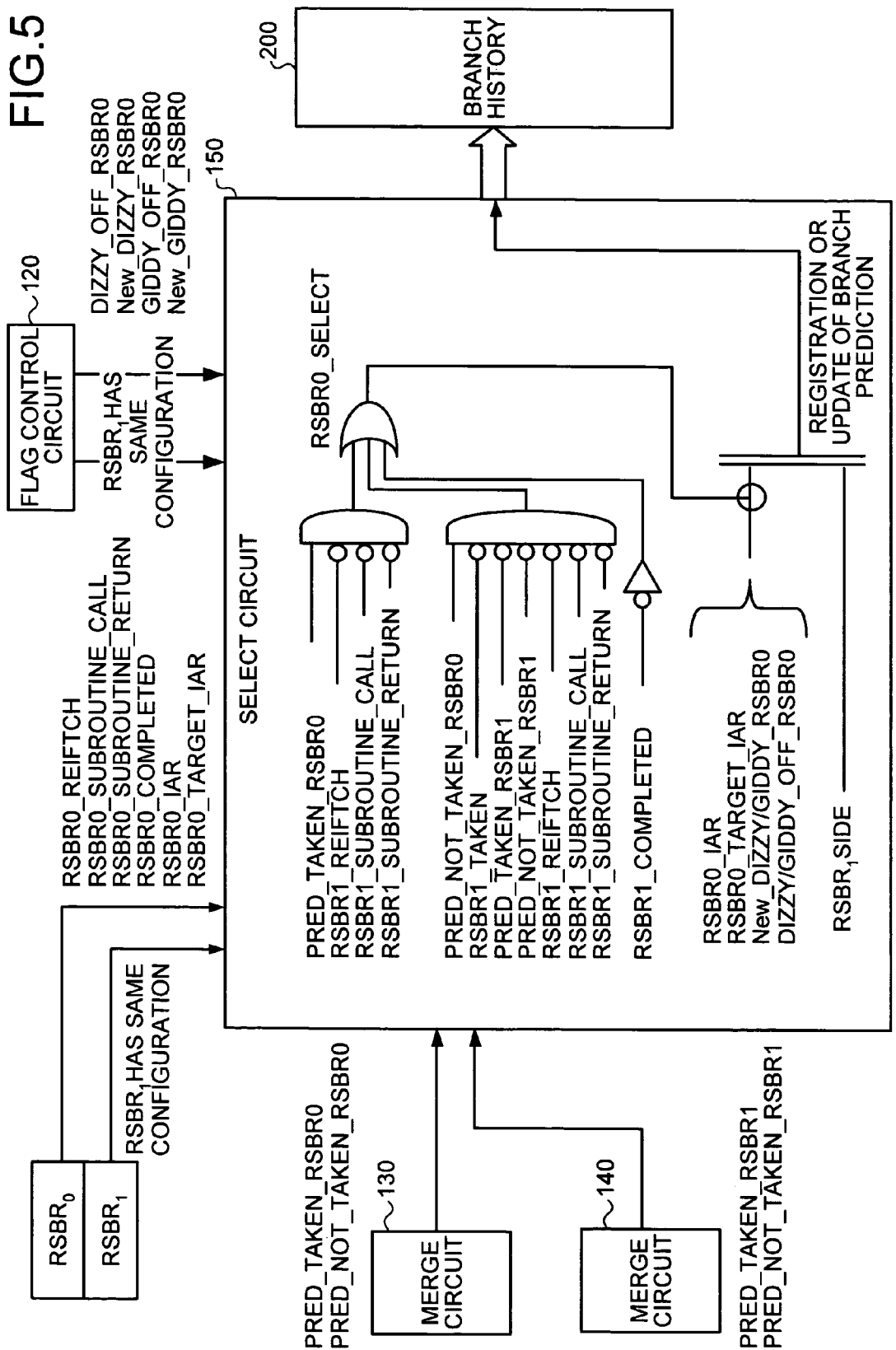
FIG. 5 illustrates one example of a select circuit.

FIG. 5 illustrates one example of the select circuit 150. The select circuit 150 receives RSBR0_REIFTCH, RSBR0_SUBROUTINE_CALL, RSBR0_SUBROUTINE_RETURN, RSBR0_COMPLETED, RSBR0_IAR, and RSBR0_TARGET_IAR from $RSBR_0$.

Here, RSBR0_REIFTCH indicates an instruction re-fetch request on completion of the branch instruction from $RSBR_0$. The RSBR0_SUBROUTINE_CALL indicates that the branch instruction from $RSBR_0$ is a subroutine call. The RSBR0_SUBROUTINE_RETURN indicates that the branch instruction from $RSBR_0$ is subroutine return, and the RSBR0_COMPLETED indicates that execution of the branch instruction from $RSBR_0$ is completed. The RSBR0_IAR is an instruction address of the branch instruction from $RSBR_0$. The RSBR0_TARGET_IAR is a branch destination address of the branch instruction received from $RSBR_0$. The select circuit 150 receives similar signals from $RSBR_1$.

The select circuit 150 receives DIZZY_OFF_RSBR0, New_DIZZY_RSBR0, GIDDY_OFF_RSBR0, and New_GIDDY_RSBR0 from the flag control circuit 120, and PRED_TAKEN_RSBR0 and PRED_NOT_TAKEN_RSBR0 from the merge circuit 130.

Here, PRED_TAKEN_RSBR0 indicates that the global history 100 predicts that the branch instruction from $RSBR_0$ is "Taken", and PRED_NOT_TAKEN_RSBR0 indicates that the global history 100 predicts that the branch instruction from $RSBR_0$ is "Not Taken".

The select circuit 150 receives PRED_TAKEN_RSBR1 and PRED_NOT_TAKEN_RSBR1 from the merge circuit 140.

The select circuit 150 uses AND of PRED_TAKEN_RSBR0, negation of RSBR1_REIFTCH, negation of RSBR1_SUBROUTINE_CALL, and negation of RSBR1_SUBROUTINE_RETURN to generate RSBR0_SELECT. When two branch instructions are completed simultaneously, if the execution result of the branch instruction from $RSBR_0$ is "Not Taken", PRED_TAKEN_RSBR0 indicates that the branch instruction from $RSBR_0$ is predicted as a change in the branch direction (priority level 3) in the global history 100.

That is, if the global history 100 predicts a change in the branch direction for the branch instruction from $RSBR_0$, if there is no instruction re-fetch request for the branch instruction from $RSBR_1$, and if the branch instruction from $RSBR_1$ is neither a subroutine call nor subroutine return (the branch instruction from $RSBR_1$ does not fall under the priority level 1 or 2), the select circuit 150 selects the branch instruction from $RSBR_0$ as an object to be updated in the branch history 200.

The select circuit 150 uses AND of PRED_NOT_TAKEN_RSBR0, negation of RSBR1_TAKEN, negation of PRED_TAKEN_RSBR1, negation of PRED_NOT_TAKEN_RSBR1, negation of RSBR1_REIFTCH, negation of RSBR1_SUBROUTINE_CALL, and negation of RSBR1_SUBROUTINE_RETURN, to generate RSBR0_SELECT.

Here, since there is no instruction re-fetch, it is not necessary to set the Dizzy flag and the Giddy flag. Therefore, a reset is the only case of update of these flags. There is the possibility of a flag reset, only if RSBR1_TAKEN is true, that is, only if $RSBR_1$ is "Taken". Therefore, the select circuit 150 selects the branch instruction from $RSBR_1$, when RSBR1_TAKEN is true (priority level 4).

Further, if PRED_TAKEN_RSBR1 and PRED_NOT_TAKEN_RSBR1 both are false, the global history 100 cannot perform prediction for the branch instruction from $RSBR_1$. For example, if the branch history information is not sufficient, the prediction by the global history 100 is not possible.

In other words, if the global history 100 predicts that there is no change in the branch direction of the branch instruction from $RSBR_0$, if flag reset is not caused by the branch instruction from $RSBR_1$ (the branch instruction from $RSBR_1$ does not fall under the priority level 4, and hence RSBR1_TAKEN is false), if the global history 100 cannot perform prediction with respect to the branch instruction from $RSBR_1$ (the branch instruction from $RSBR_1$ does not fall under the priority level 3), if there is no instruction re-fetch request with respect to the branch instruction from $RSBR_1$ (the branch instruction from $RSBR_1$ does not fall under the priority level 1), and if the branch instruction from $RSBR_1$ is not a subroutine call or subroutine return (the branch instruction from $RSBR_1$ does not fall under the priority level 2), the select circuit 150 selects the branch instruction from $RSBR_0$ as an object to be updated in the branch history 200.

Further, if RSBR1_COMPLETED is false, the branch instruction from $RSBR_1$ is not completed. In this case, the select circuit 150 selects the branch instruction from $RSBR_0$ as the object to be updated in the branch history 200. An instruction re-fetch from $RSBR_0$ (priority level 1), or an unconditional branch instruction such as subroutine call or subroutine return (priority level 2), are included in the case when RSBR1_COMPLETED is false.

Thus, since the select circuit 150 selects the branch instruction to be updated in the branch history 200, based on the priority levels (1) to (4), the branch history 200 having only one input port can be matched with the global history 100 that generates one output.

Figure 6:
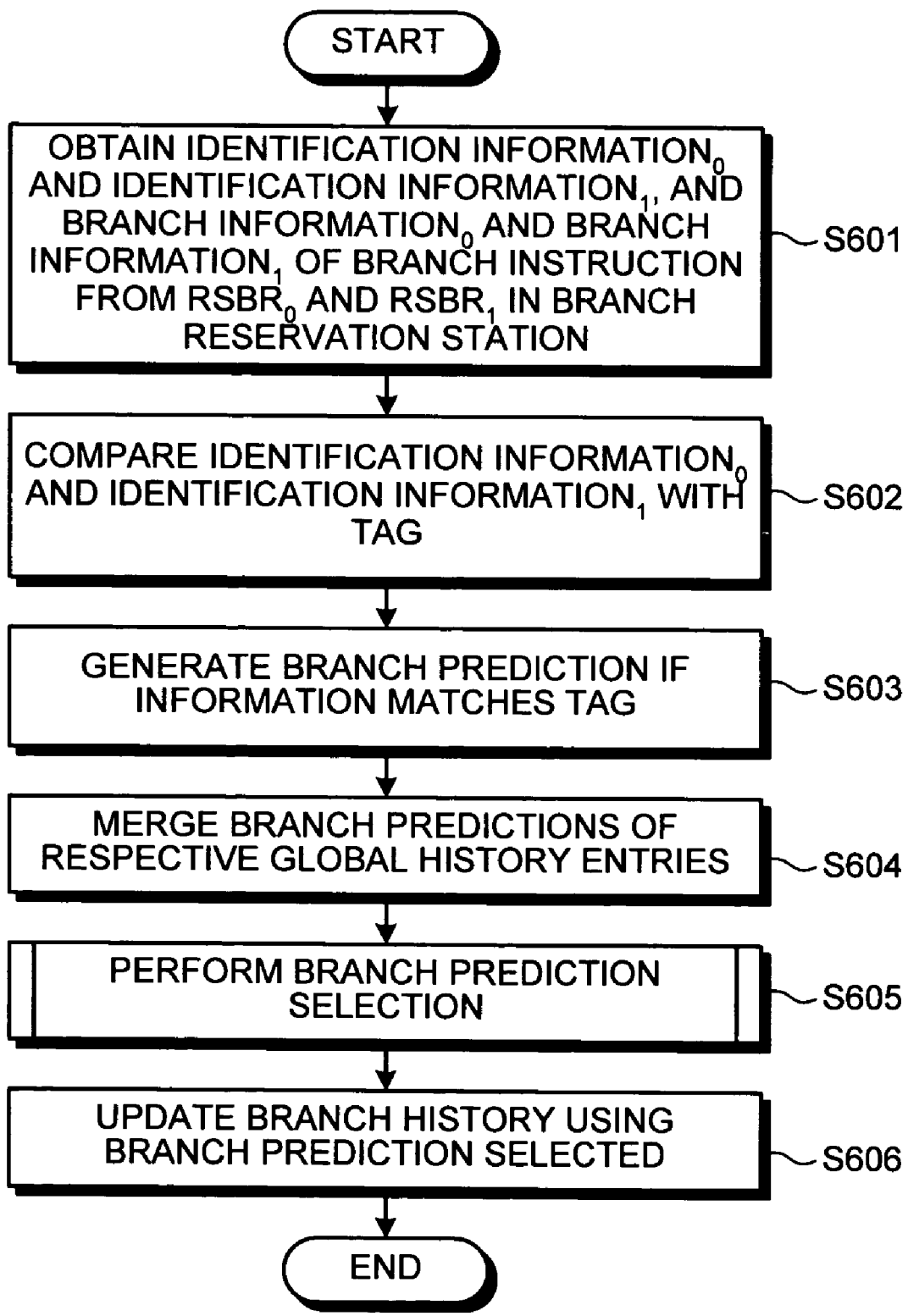
FIG. 6 is a flowchart of an operation in the global history.

The process procedure in the global history 100 according to the embodiment will be explained below. FIG. 6 is a flowchart of an operation in the global history 100. The global history 100 obtains the identification information$_0$ and branch information$_0$ from $RSBR_0$, and the identification information$_1$ and branch information$_1$ from $RSBR_1$ in the branch reservation station 40 (step S601).

The respective global history entries compare the identification information$_0$ and identification information$_1$ with the tag stored in the tag section 111 (step S602). The global history entry, in which the information matches the tag, generates a branch prediction (step S603).

The merge circuit 130 merges the branch predictions of the respective global history entries, to generate branch prediction$_0$, and the merge circuit 140 merges the branch predictions of the respective global history entries, to generate branch prediction$_1$ (step S604).

When two branch prediction$_0$ and branch prediction$_1$ are generated simultaneously, the select circuit 150 uses the information from the branch reservation station 40 and the flag update information generated by the flag control circuit 120, to select either branch prediction$_0$ or branch prediction$_1$ (step S605). The select circuit 150 then updates the branch history 200 using the branch prediction selected (step S606).

In this manner, the respective global history entries compare the identification information$_0$ and identification information$_1$ with the tag stored in the tag section 111, and the global history entry in which the information matches the tag generates a branch prediction. Consequently, the global history 100 can process two branch instructions completed simultaneously.

Figure 7:
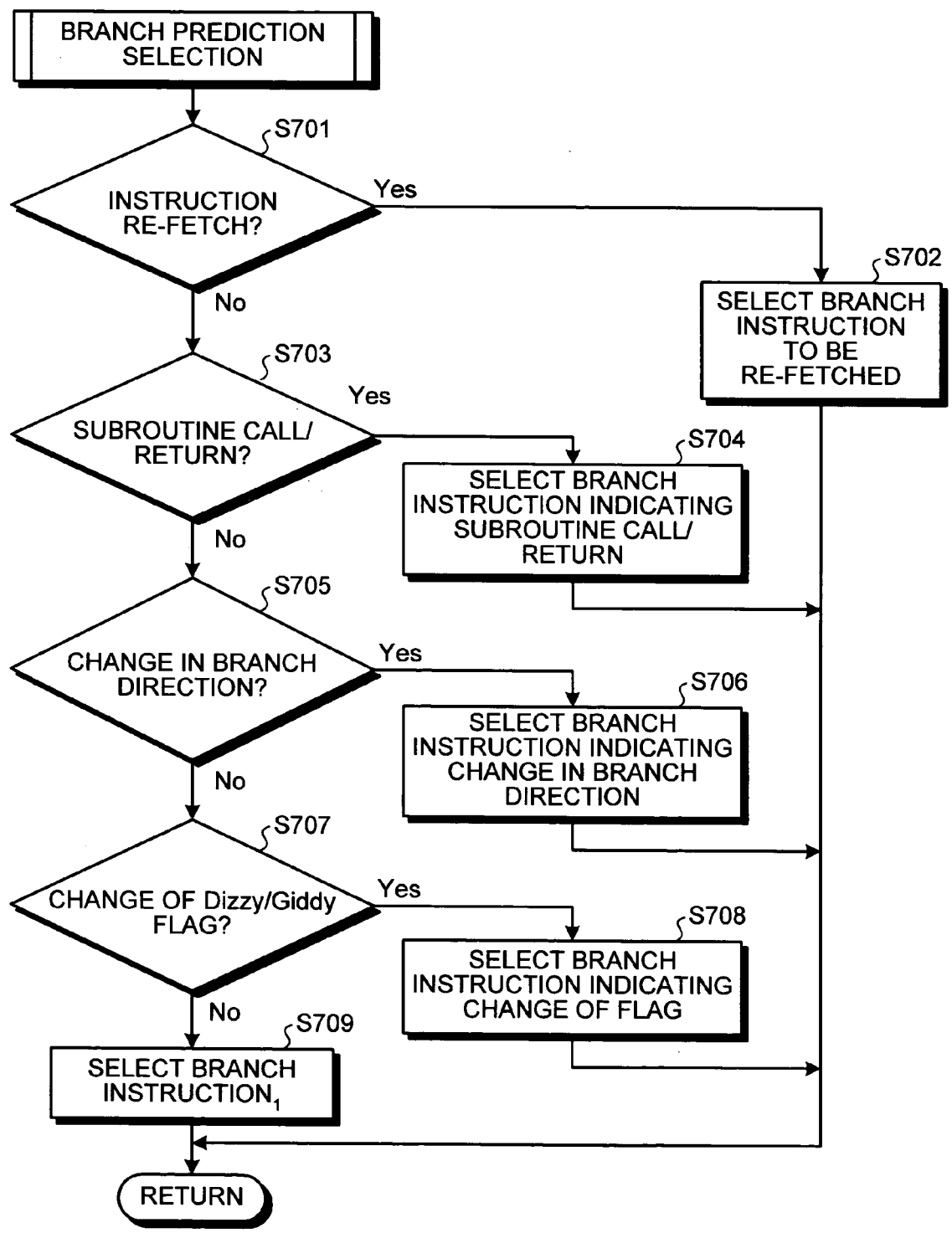
FIG. 7 is a flowchart of the branch prediction selection illustrated in FIG. 6.
Figure 8:
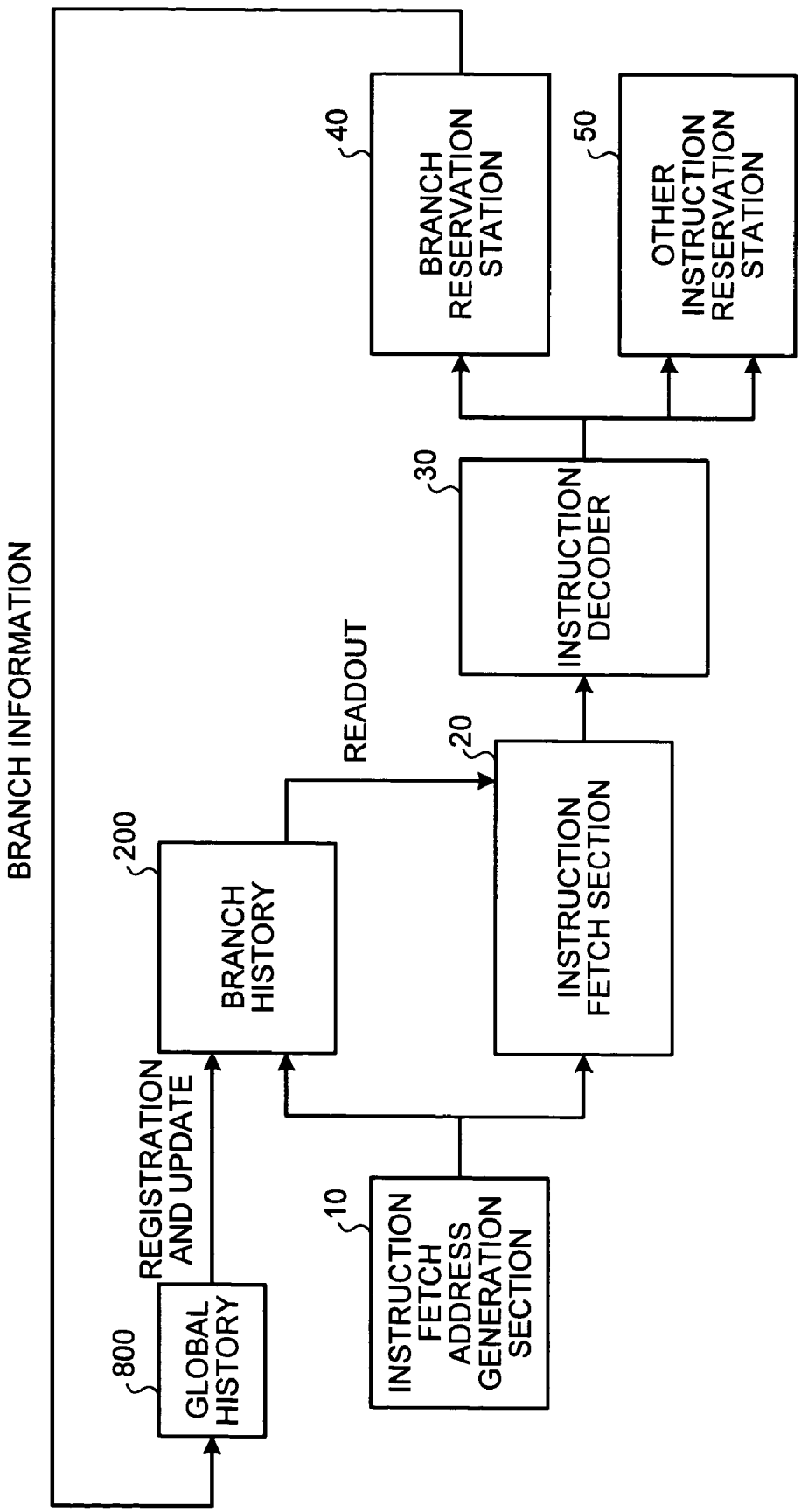
FIG. 8 illustrates a conventional branch prediction apparatus using the global history.

The procedure for the branch prediction selection (step S605) will be explained below. FIG. 7 is a flowchart of the branch prediction selection illustrated in FIG. 6. The branch prediction selection process first checks whether an instruction re-fetch request is generated on completion of any branch instruction (step S701).

If such an instruction re-fetch request is generated, the corresponding branch instruction is selected as an object to be updated in the branch history 200 (step S702).

If no instruction re-fetch request is generated even after completion of both branch instructions, it is checked whether either of the branch instructions indicates subroutine call or subroutine return (step S703).

If either of the branch instructions is a subroutine call or a subroutine return, the corresponding branch instruction is selected as an object to be updated in the branch history 200 (step S704).

If both branch instructions do not indicate subroutine call or subroutine return, it is checked if the branch prediction for either of the branch instructions indicates a change in the branch direction (step S705). If a change in the branch direction is predicted for either of the branch instructions, the corresponding branch instruction is selected as an object to be updated in the branch history 200 (step S706).

If the branch predictions for both branch instructions do not indicate a change in the branch direction, it is checked if either of branch instructions indicates a change of state of the Dizzy flag or the Giddy flag (step S707). If either of branch instructions indicates a change of state of the Dizzy flag or the Giddy flag, the corresponding branch instruction is selected as an object to be updated in the branch history 200 (step S708).

If both branch instructions do not indicate a change of state of the Dizzy flag or the Giddy flag, the branch instruction$_1$, that is, the branch instruction from RSBR$_1$, is selected as an object to be updated in the branch history 200 (step S709).

Thus, when two branch predictions are performed simultaneously, for each of the branch instructions, the branch prediction selection process checks whether the branch instruction relates to instruction re-fetch, subroutine call/return, change in the branch direction, or change of state of the flags. The relevant branch instruction is selected as an object to be updated in the branch history 200. Thus, the branch history 200 having only one input port can be matched with the global history 100 that generates one output.

In this embodiment, the global history entry$_i$ 110 (i=1, 2, . . . , n) receives identification information$_0$ from RSBR$_0$ and identification information$_1$ from RSBR$_1$ simultaneously. The comparison circuit 112 in the global history entry$_i$ 110 compares the identification information$_0$ with a tag stored in the tag section 111. If the identification information$_0$ matches the tag, the global history entry$_i$ 110 generates a branch prediction$_{i\_0}$. The comparison circuit 113 in the global history entry$_i$ 110 compares the identification information$_1$ with a tag stored in the tag section 111, and if the identification information$_1$ matches the tag, the global history entry$_i$ 110 generates a branch prediction$_{i\_1}$. Consequently, the global history 100 can process two branch instructions completed simultaneously.

In this embodiment, when two branch predictions are performed simultaneously, the select circuit 150 selects either of the branch predictions based on the predetermined priority levels. Therefore, branch prediction can be performed accurately by matching the branch history 200 with the global history 100, and without increasing the number of ports of the branch history 200.

In this embodiment, an example in which the global history receives two branch instructions completed simultaneously and performs two branch predictions has been explained. However, the present invention is not limited thereto, and is also applicable when an optional number of branch instructions are completed simultaneously.

This embodiment explains an example in which the global history refines two branch predictions predicted simultaneously to one branch prediction, to thereby update the branch history. However, the present invention is not limited thereto, and is also applicable when an optional number of branch predictions is refined to the number of inputs accepted simultaneously by the branch history. Alternatively, a plurality of branch predictions predicted simultaneously by the global history may be divided into a plurality of cycles, to update the branch history.

This embodiment explains an example in which the branch history is updated based on the prediction result of the global history. However, the present invention is not limited thereto, and is also applicable when the prediction result of the global history is directly used for branch prediction.

According to method and apparatus for branch prediction of the present invention, the accuracy of the branch prediction improves.

Moreover, since the branch history is updated based on the number of input ports provided in the branch history, the branch histories having a fewer number of input ports can be combined and used.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A branch prediction apparatus comprising:
a branch information receiving unit that receives simultaneously, a plurality of branch information for each of a plurality of branch instructions that are completed simultaneously; and
a parallel branch predicting unit that performs branch prediction in parallel for the branch instructions completed simultaneously, based on the branch information received and a branch history information of the respective branch instructions, to thereby obtain branch direction prediction results, wherein the apparatus further performs branch prediction by letting the branch direction prediction results act on a branch prediction mechanism having target addresses, wherein
the parallel branch predicting unit includes a branch direction predicting unit that predicts whether a branch direction is taken or not taken based on the branch information of the branch instruction and the branch history information of the branch instruction, wherein the branch direction predicting unit has branch instruction addresses without target addresses, the parallel branch predicting unit further includes a plurality of branch predicting sub-units that perform branch prediction in parallel, and each of the branch predicting sub-units includes an identifier storing unit that stores an identifier per branch instruction to identify the branch instruction.

2. The branch prediction apparatus according to claim 1, wherein the identifier stored in the identifier storing unit is different for each of the branch instructions, and if the plurality of branch information received simultaneously by the branch information receiving unit correspond to the branch information concerning the branch instructions having a same identifier, the branch direction predicting unit performs branch prediction for the branch instructions having the same identifier, as if the branch information were received in order.

3. The branch prediction apparatus according to claim 1, wherein the identifier stored is same for different branch instructions, and if the branch information received simultaneously correspond to the different branch instructions having a same identifier, the branch direction predicting unit performs branch prediction by selecting the branch information corresponding to any one of the branch instructions, from among the branch information received, wherein the correspondence between the stored identifier and the branch information is made with reference to only an address of the branch instruction.

4. The branch prediction apparatus according to claim 1, further comprising:
a branch history unit; and
a parallel registering unit that registers a plurality of the branch direction prediction results obtained by the parallel branch predicting unit, in parallel with the branch history unit, wherein the branch history unit is used for predicting a branch destination of the branch instruction, based on an association table that associates the address of the branch instruction with the address of the branch destination predicted.

5. The branch prediction apparatus according to claim 1, further comprising:
a branch history unit;
a selecting unit that selects a predetermined number of the branch direction prediction results, from among the branch direction prediction results obtained; and
a selective registering unit that registers, in the branch history unit, the predetermined number of the branch prediction results selected, wherein the branch history unit is used for predicting a branch destination of the branch instruction, based on an association table that associates the address of the branch instruction with the address of the branch destination predicted.

6. The branch prediction apparatus according to claim 5, wherein the selecting unit selects the predetermined number of the branch direction prediction results based on predetermined priority levels given to the branch instructions.

7. A branch prediction apparatus comprising:
a branch information receiving unit that receives simultaneously, a plurality of branch information for each of a plurality of branch instructions that are completed simultaneously;
a parallel branch predicting unit that performs branch prediction in parallel for the branch instructions completed simultaneously, based on the branch information received and a branch history information of the respective branch instructions, to thereby obtain branch prediction results comprising a branch direction prediction;
a branch history unit;

a selecting unit that selects a predetermined number of the branch prediction results, from among the branch prediction results obtained; and
a selective registering unit that registers, in the branch history unit, the predetermined number of the branch prediction results selected, wherein the branch history unit is used for predicting a branch destination of the branch instruction, based on an association table that associates the address of the branch instruction with the address of the branch destination predicted,
wherein the selecting unit selects the predetermined number of the branch prediction results based on predetermined priority levels given to the branch instructions,
wherein the branch instructions are prioritized in an order of a branch prediction result for instruction re-fetch, a branch prediction result for updating a branch predicting mechanism, a branch prediction result predicted as a branch direction change, and a branch prediction result for updating a state, registered in the branch history unit, corresponding to each branch instruction.

8. The branch prediction apparatus according to claim 7, wherein the branch predicting mechanism performs branch prediction with respect to a pair of unconditional branch instructions for subroutine call and for subroutine return.

9. The branch prediction apparatus according to claim 7, wherein the state registered includes a Dizzy flag that is set if no branch occurs even though the branch history unit predicted a branch, and a Giddy flag that is set if the branch destination is wrong, even though a branch occurs as is predicted by the branch history unit.

10. The branch prediction apparatus according to claim 9, further comprising a flag control unit that provides control to update the Dizzy flag and the Giddy flag based on the branch information received.

11. A branch prediction method comprising:
receiving simultaneously, a plurality of branch information for each of a plurality of branch instructions that are completed simultaneously; and
performing branch prediction in parallel for the branch instructions completed simultaneously, based on the plurality of branch information received and a branch history information of the respective branch instructions, thereby obtaining branch direction prediction results taken or not taken, wherein the apparatus further performs branch prediction by letting the branch prediction results act on a branch prediction mechanism, wherein
the performing includes executing a plurality of branch prediction sub-steps each including
reading an identifier for identifying the branch instruction from a storing unit; and
predicting a branch direction with respect to a branch instruction, from among the plurality of branch instructions, wherein an identifier of the branch instruction matches the identifier read, based on the branch history information of the branch instruction and the branch information.

12. The branch prediction method according to claim 11, wherein the identifier read is different for each the branch instructions, and wherein if the plurality of branch information received simultaneously correspond to the branch information concerning the branch instructions having a same identifier, the performing includes performing the branch prediction as if the plurality of branch information were received in order.

13. The branch prediction method according to claim 11, further comprising registering in parallel, in the branch history unit, a plurality of the branch prediction results, wherein the branch history unit is used for predicting a branch destination of the branch instruction, based on an association table that associates the address of the branch instruction with the address of the branch destination predicted.

14. The branch prediction method according to claim 11, further comprising:
   selecting a predetermined number of the branch prediction results, from among the branch prediction results obtained; and
   selective registering that includes registering, in the branch history unit, the predetermined number of the branch prediction results selected, wherein the branch history unit is used for predicting a branch destination of the branch instruction, based on an association table that associates the address of the branch instruction with the address of the branch destination predicted.

15. The branch prediction method according to claim 14, wherein the selecting includes selecting the predetermined number of the branch prediction results based on predetermined priority levels given to the branch instructions.

16. A branch prediction method, the method comprising:
   receiving simultaneously, a plurality of branch information for each of a plurality of branch instructions that are completed simultaneously;
   performing branch prediction in parallel for the branch instructions completed simultaneously, based on the plurality of branch information received and a branch history information of the respective branch instructions, thereby obtaining branch prediction results
   selecting a predetermined number of the branch prediction results, from among the branch prediction results obtained;
   selective registering that includes registering, in the branch history unit, the predetermined number of the branch prediction results selected, wherein the branch history unit is used for predicting a branch destination of the branch instruction, based on an association table that associates the address of the branch instruction with the address of the branch destination predicted, wherein the selecting includes selecting the predetermined number of the branch prediction results based on predetermined priority levels given to the branch instructions; and
   prioritizing the branch instructions in an order of a branch prediction result for instruction re-fetch, a branch prediction result for updating a branch predicting mechanism, a branch prediction result predicted as a branch direction change, and a branch prediction result for updating a state, registered in the branch history unit, corresponding to each branch instruction.

17. The branch prediction method according to claim 16, wherein the branch predicting mechanism comprises performing branch prediction with respect to a pair of an unconditional branch instruction for subroutine call and for subroutine return.

18. The branch prediction method according to claim 16, wherein the state registered includes a Dizzy flag that is set if no branch occurs even though the branch history unit has predicted a branch, and a Giddy flag that is set if the branch destination is wrong, even though a branch occurs as is predicted by the branch history unit.

19. A branch prediction apparatus, the apparatus comprising:
   a branch receiving unit receiving simultaneously a plurality of branch information for branch instructions completed simultaneously; and
   a parallel branch prediction unit producing in parallel a plurality of branch direction prediction results for branch information received by the receiving unit, a branch direction prediction result being predicted with respect to a branch instruction address and a branch history information, wherein the parallel branch prediction unit includes a branch direction predicting unit that stores a number T of branches continuously taken in the past and a number N of branches continuously not taken, predicts that the next branch is not taken when the current number of branches continuously taken becomes equal to T, and predicts that the next branch is taken when the current number of branches continuously not taken becomes equal to N.

* * * * *